US011049289B2

(12) United States Patent
Morard et al.

(10) Patent No.: US 11,049,289 B2
(45) Date of Patent: Jun. 29, 2021

(54) SYSTEMS AND METHODS TO SEMI-AUTOMATICALLY SEGMENT A 3D MEDICAL IMAGE USING A REAL-TIME EDGE-AWARE BRUSH

(71) Applicant: General Electric Company, Schenectady, NY (US)

(72) Inventors: Vincent Morard, Buc (FR); Terry Gallico, Buc (FR); Nicolas Gogin, Buc (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/244,821

(22) Filed: Jan. 10, 2019

(65) Prior Publication Data

US 2020/0226798 A1  Jul. 16, 2020

(51) Int. Cl.
*G06K 9/00*  (2006.01)
*G06T 11/00*  (2006.01)
(Continued)

(52) U.S. Cl.
CPC .......... *G06T 11/001* (2013.01); *G06T 5/003* (2013.01); *G06T 5/005* (2013.01); *G06T 11/60* (2013.01);
(Continued)

(58) Field of Classification Search
CPC ... G06T 7/0081; G06T 7/0083; G06T 7/0075; G06T 7/0022; G06T 2207/20144;
(Continued)

(56) References Cited

U.S. PATENT DOCUMENTS 4,931,784 A * 6/1990 Easterbrook ............. G09G 5/20
345/418
5,835,086 A   11/1998 Bradstreet et al.
(Continued)

FOREIGN PATENT DOCUMENTS

WO   2007095482   8/2007

OTHER PUBLICATIONS

Chen et al., "Real-time Edge-Aware Image Processing with the Bilateral Grid,"Computer Science and Artificial Intelligence Laboratory Massachusetts Institute of Technology Figure, retrieved from https://groups.csail.mit.edu/graphics/bilagrid/bilagrid_web.pdf on Jan. 10, 2019, 9 pages.

(Continued)

*Primary Examiner* — Amir Alavi
(74) *Attorney, Agent, or Firm* — Hanley, Flight and Zimmerman, LLC

(57) ABSTRACT

Apparatus, systems, and methods to generate an edge aware brush for navigation and segmentation of images via a user interface are disclosed. An example processor is to at least: construct a brush for segmentation of image data; provide an interactive representation of the brush with respect to the image data via a user interface, the interactive representation to be displayed and made available for interaction in each of a plurality of viewports provided for display of views of the image data in the user interface; enable update of the viewports based on manipulation of the representation; facilitate display of a preview of a segmentation of the image data corresponding to a location of the representation; and, when the segmentation is confirmed, facilitate generation of an output based on the segmentation.

20 Claims, 9 Drawing Sheets

(51) Int. Cl.
*H04N 1/62* (2006.01)
*G06T 11/60* (2006.01)
*G06T 5/00* (2006.01)
G06F 3/0484 (2013.01)
G06T 5/20 (2006.01)
G06K 9/40 (2006.01)
G09G 5/02 (2006.01)

(52) U.S. Cl.
CPC ........... *H04N 1/62* (2013.01); *G06F 3/04845* (2013.01); *G06K 9/40* (2013.01); *G06T 5/002* (2013.01); *G06T 5/20* (2013.01); *G06T 2207/20192* (2013.01); *G09G 5/026* (2013.01)

(58) Field of Classification Search
CPC . G06T 2207/10016; G06T 2207/10012; G06T 11/001; H04N 13/0239; H04N 13/0082; H04N 1/62; G06K 9/38
See application file for complete search history.

(56) References Cited

U.S. PATENT DOCUMENTS

| | | | |
|---|---|---|---|
| 6,226,000 B1 | 5/2001 | Richens et al. | |
| 6,456,297 B1 | 9/2002 | Wilensky | |
| 7,602,405 B2 | 10/2009 | Hsu | |
| 7,609,888 B2* | 10/2009 | Sun | G06K 9/00369 382/164 |
| 7,724,954 B2* | 5/2010 | Fluck | G06K 9/38 382/128 |
| 7,978,938 B1 | 7/2011 | Wilensky | |
| 8,386,964 B2* | 2/2013 | Sun | G06T 11/00 715/856 |
| 8,487,963 B1 | 7/2013 | Harris et al. | |
| 8,526,763 B2* | 9/2013 | Yadav | G06T 5/008 348/263 |
| 8,611,728 B2* | 12/2013 | Bhagavathy | G06T 7/254 345/640 |
| 8,655,097 B2 | 2/2014 | Chien et al. | |
| 8,792,718 B2* | 7/2014 | Bai | H04N 5/21 382/173 |
| 8,897,562 B2* | 11/2014 | Bai | G06T 7/194 382/173 |
| 8,970,581 B2 | 3/2015 | Shi et al. | |
| 9,730,671 B2* | 8/2017 | Gering | G01R 33/546 |
| 2005/0231530 A1 | 10/2005 | Liang et al. | |
| 2009/0136096 A1 | 5/2009 | Sirohey et al. | |
| 2010/0272367 A1 | 10/2010 | Criminisi et al. | |
| 2011/0102457 A1 | 5/2011 | Bhatt et al. | |
| 2012/0023456 A1 | 1/2012 | Sun et al. | |
| 2013/0083021 A1 | 4/2013 | Cohen | |
| 2013/0135306 A1* | 5/2013 | Engel | G06T 15/06 345/423 |
| 2014/0328549 A1 | 11/2014 | Ahmann et al. | |
| 2020/0054398 A1* | 2/2020 | Kovtun | G06T 19/20 |

OTHER PUBLICATIONS

The Segmentation Plugin, "Medical Imaging Interaction Toolkit," retrieved from http://docs.mitk.org/2016.11/org_mitk_views_segmentation.html on Jan. 10, 2019, 6 pages.

Apply Topaz effects quickly and efficiently with the Topaz photoFXlab standalone software, retrieved from https://topazlabs.com/photofxlab on Jan. 10, 2019, 7 pages.

Mark Wood, "Using Brushes & Mask Effects in Aperture 3," Published: Jan. 26, 2014, retrieved from https://www.behance.net/gallery/14035783/Using-Brushes-Mask-Effects-In-Aperture-3 on Jan. 10, 2019, 11 pages.

"ITK-SNA," retrieved from https://en.wikipedia.org/wiki/ITK-SNAP, on Jan. 10, 2019, 3 pages.

Osher, "Nonlinear total variation based noise removal algorithms," Article in Physica D Nonlinear Phenomena 60 (1-4):259-268, Nov. 1992, retrieved from https://www.researchgate.net/publication/222469583_Nonlinear_total_variation_based_noise_removal_algorithms, on Jan. 10, 2019, 8 pages.

Valenzuela et al., "iSix—Image Segmentation in Osirix," Jan. 2013, 2 pages.

Tomasi, "Bilateral Filtering for Gray and Color Images," Proceedings of the 1998 IEEE International Conference on Computer Vision, Bombay, India, 8 pages.

Valenzuela et al., "FISICO: Fast image segmentation correction," May 2016, 18 pages.

Perona, "Scale-Space and Edge Detection Using Anisotropic Diffusion," IEEE Transactions On Pattern Analysis And Machine Intelligence, vol. 12. No. 7. Jul. 1990, 11 pages.

Lerallut et al., "Image filtering using morphological amoebas," retrieved from https://hal-mines-paristech.archives-puvertes.fr/hal-01431825, on Jan. 10, 2019, 19 pages.

Šoltészováet al., "Advanced volume painting with game controllers,"SSCCG '09: Proceedings of the 25th Spring Conference on Computer Graphics Apr. 2009, 9 pages.

Dan R Olsen et al: "Edge-respecting brushes", Proceedings of the 21ST Annual ACM Symposium on User Interface Software and Technology, UIST '08, Oct. 19, 2008 (Oct. 19, 2008), pp. 171-180, XP055155569, New York, New York, USA DOI: 10.1145/1449715.1449742 ISBN: 978-1-59-593975-3.

EP application 20150816.5 filed Jan. 8, 2020—extended Search Report dated Sep. 29, 2020; 10 pages.

Ney D R et al: "Editing Tools for 3D Medical Imaging", IEEE Computer Graphics and Applications, IEEE Service Center, New York, NY, US, vol. 11, No. 6, Nov. 1, 1991 (Nov. 1, 1991), pp. 63-71, XP000237430, ISSN: 0272-1716, DOI: 10.1109138.103395.

* cited by examiner

SYSTEMS AND METHODS TO SEMI-AUTOMATICALLY SEGMENT A 3D MEDICAL IMAGE USING A REAL-TIME EDGE-AWARE BRUSH

FIELD OF THE DISCLOSURE

This disclosure relates generally to improved medical systems and, more particularly, to improved learning systems and methods for medical image processing.

BACKGROUND

A variety of economy, operational, technological, and administrative hurdles challenge healthcare facilities, such as hospitals, clinics, doctors' offices, imaging centers, teleradiology, etc., to provide quality care to patients. Economic drivers, less skilled staff, fewer staff, complicated equipment, and emerging accreditation for controlling and standardizing radiation exposure dose usage across a healthcare enterprise create difficulties for effective management and use of imaging and information systems for examination, diagnosis, and treatment of patients.

Healthcare provider consolidations create geographically distributed hospital networks in which physical contact with systems is too costly. At the same time, referring physicians want more direct access to supporting data in reports along with better channels for collaboration. Physicians have more patients, less time, and are inundated with huge amounts of data, and they are eager for assistance.

Healthcare provider (e.g., x-ray technologist, doctor, nurse, etc.) tasks including image processing and analysis, quality assurance/quality control, etc., are time consuming and resource intensive tasks impractical, if not impossible, for humans to accomplish alone.

BRIEF SUMMARY

Certain examples provide apparatus, systems, and methods to generate an edge aware brush for navigation and segmentation of images via a user interface.

Certain examples provide at least one computer readable storage medium including instructions which, when executed, cause at least one processor to at least: construct a brush for segmentation of image data; provide an interactive representation of the brush with respect to the image data via a user interface, the interactive representation to be displayed and made available for interaction in each of a plurality of viewports provided for display of views of the image data in the user interface; enable update of the viewports based on manipulation of the representation; facilitate display of a preview of a segmentation of the image data corresponding to a location of the representation; and, when the segmentation is confirmed, facilitate generation of an output based on the segmentation.

Certain examples provide an apparatus including at least one processor and at least one computer readable storage medium including instructions. The instructions, when executed, cause the at least one processor to at least: construct a brush for segmentation of image data; provide an interactive representation of the brush with respect to the image data via a user interface, the interactive representation to be displayed and made available for interaction in each of a plurality of viewports provided for display of views of the image data in the user interface; enable update of the viewports based on manipulation of the representation; facilitate display of a preview of a segmentation of the image data corresponding to a location of the representation; and, when the segmentation is confirmed, facilitate generation of an output based on the segmentation.

Certain examples provide at least one computer readable storage medium including processor-executable instructions and a data structure. The data structure includes a brush construct, the brush construct specifying an interactive representation to be displayed with respect to image data via a user interface, the interactive representation to be displayed and made available for interaction in each of a plurality of viewports provided for display of views of the image data in the user interface for segmentation of the image data. The brush construct is defined by: a shape including a radius and a gradient, wherein a value of the radius defines a default size of the representation and a value of the gradient defines a sensitivity to at least one of boundaries or contours in the image data, the representation to adapt to the at least one of boundaries or contours in the image data according to the value of the gradient defined for the brush. The brush construct is also defined by coordinates including first coordinates to store a position of the representation with respect to a first viewport of the user interface and second coordinates to store the position of the representation with respect to a second viewport of the user interface.

Figure 1:
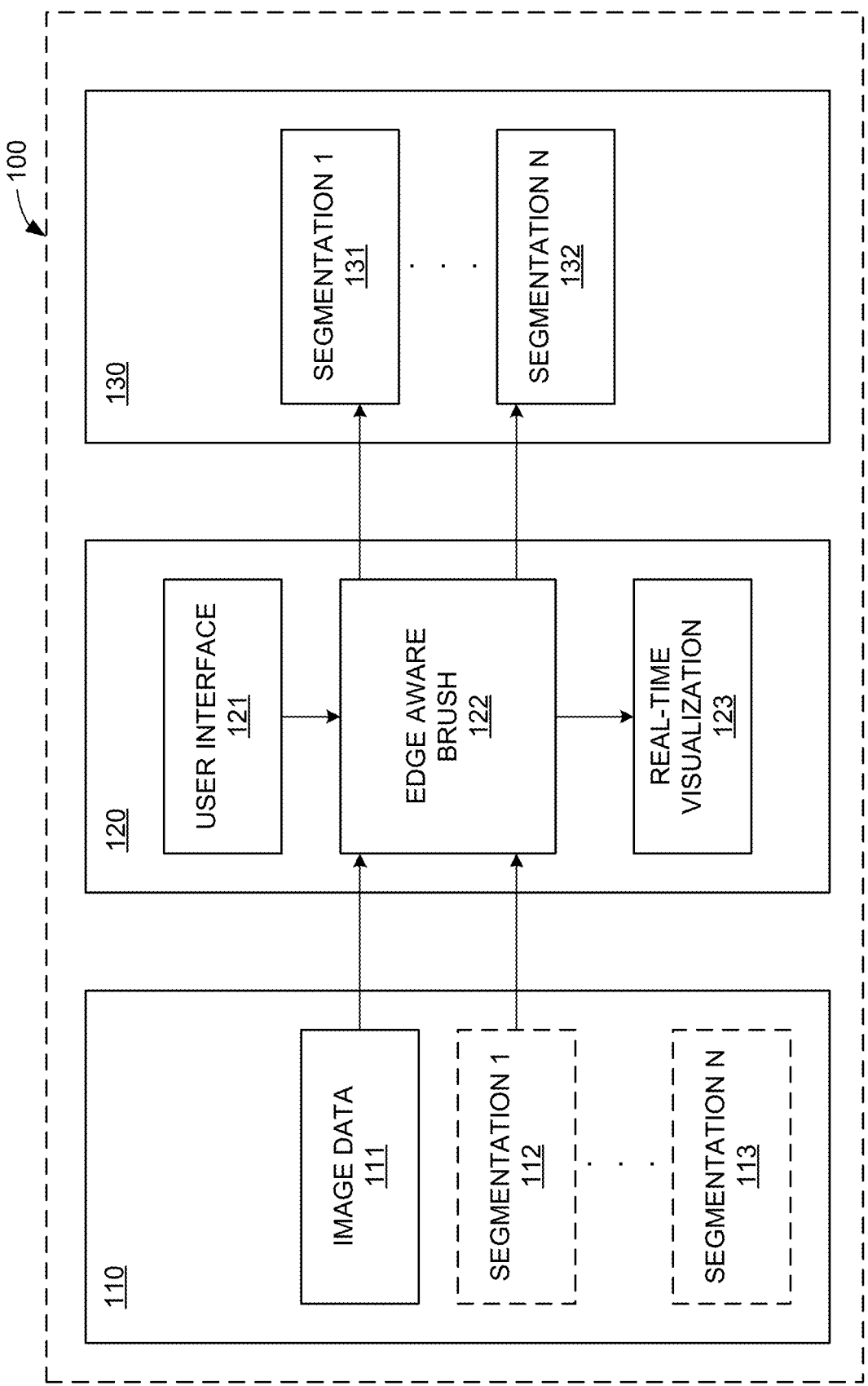
FIG. 1 illustrates an example visualization system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings. The figures are not scale. Wherever possible, the same reference numbers will be used throughout the drawings and accompanying written description to refer to the same or like parts.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

While certain examples are described below in the context of medical or healthcare systems, other examples can be implemented outside the medical environment.

Most clinical decisions are derived from an analysis of a critical set or sets of interest from some data sources. In the radiology domain, this typically involves the analysis of regions of interest from medical image data. Medical image analysis is performed at the request of a referring physician for a specific purpose such as detection, assessment, progression of anatomical abnormalities (e.g., lesions, aneurysms, atrophies, etc.), etc. To access these regions of interest and perform an analysis, these regions must first be accurately and robustly separated from other non-essential data. While many context specific algorithms exist to segment regions of interest such as organs, other anatomical features, pathological structures (e.g., lesions, nodules, etc.), etc., due to the variability in virtually all sources of medical data, these algorithms can never be perfect. Moreover, factors such as scale, noise, motion, partial voluming, and other artifacts hamper the accuracy and precision of virtually every segmentation algorithm. In many applications, an issue with results obtained from a segmentation algorithm is not accuracy based on a numerical criterion but rather how the information is perceived by a human user, who is the final arbitrator in the analysis. In such cases, there is a need to provide a flexible and yet intuitive tool to facilitate speedy, accurate segmentation.

Imperfect segmentations can be handled in a variety of ways. In some cases, the user will ignore the imperfection. In other cases, the user will try to use tools to manually adjust the segmentation. In other cases, users may resort to a manual method of segmenting the regions of interest. Methods that involve manual adjustments, including those that allow for adjustments to contours in 2D and 3D, create a situation in which the results of the manual segmentations cannot be reproduced with any degree of fidelity. For example, in clinical studies there is an inter and intra variability of 10% among radiologists determining the diameter of a lesion. In a volumetric sense, the variability translates to more than 20% variability.

There is a need for an easy, repeatable and reproducible semi-automated segmentation method that provides a degree of flexibility to the user in situations of imperfect, failed segmentations, no segmentation, etc. Certain examples provide a preview mechanism and edge awareness properties in a tool to help decrease inter- and intra-variability among radiologists.

Certain examples provide a framework based on a real-time deformable brush to allow a human to interact and select relevant parts in a 3D image. This framework includes a 3D real time preview of the brush to enable a fast edition of the segmentation in an efficient manner to improve accuracy, precision, repeatability and reproducibility. Further, usability of the tool reduces user interaction and, therefore, speeds up the segmentation process.

FIG. 1 illustrates an example visualization system 100 including one or more image data inputs 110. For example, input can include a three-dimensional (3D) input image 111 (e.g., a computed tomography (CT) image, a magnetic resonance (MR) image, an ultrasound image, an x-ray image, a positron emission tomography (PET) image, etc.). The one or more 3D images can show an inner portion or anatomy of a body to control, for example. As shown in the example of FIG. 1, one or more initial segmentations 112-113 of the underlying 3D image 111 (e.g., organ, tumor, muscle, bone, etc.) can be provided. However, the segmentation and editing process can begin with the image input 111 without segmentation.

The example system 100 also includes a processor 120 to construct an edge aware brush 122 with a 2D/3D real-time visualization 123 of its shape, displayed for interaction via a user interface 121. The combination of user interface 121, edge aware brush 122, and real-time rendering 123 (e.g., 3D rendering on 2D slice image data, oblique image views on 3D virtual reality data, etc.) enables a fast and accurate segmentation of structures of interest from the 3D image 111. The elements of the processor 120 are described in further detail with respect to FIGS. 2, 3, and 5 below.

The example system 100 also includes an output generator 130 to provide an output of the processor 120. For example, the output 130 provides final segmentation 131, 132 of relevant parts of the 3D image 111. This multiple 3D binary segmentation 131, 132 can be used for a variety of applications such as to assess a volume of a structure of interest, to provide ground truth for a deep learning algorithm, etc. In certain examples, segmentation of the underlying 3D volume 111 can be stored as a run-length encoded (RLE) binary mask. The mask enables faster encoding and decoding of the segmentation which is useful for real-time visualization of the tool, for example.

Figure 2:
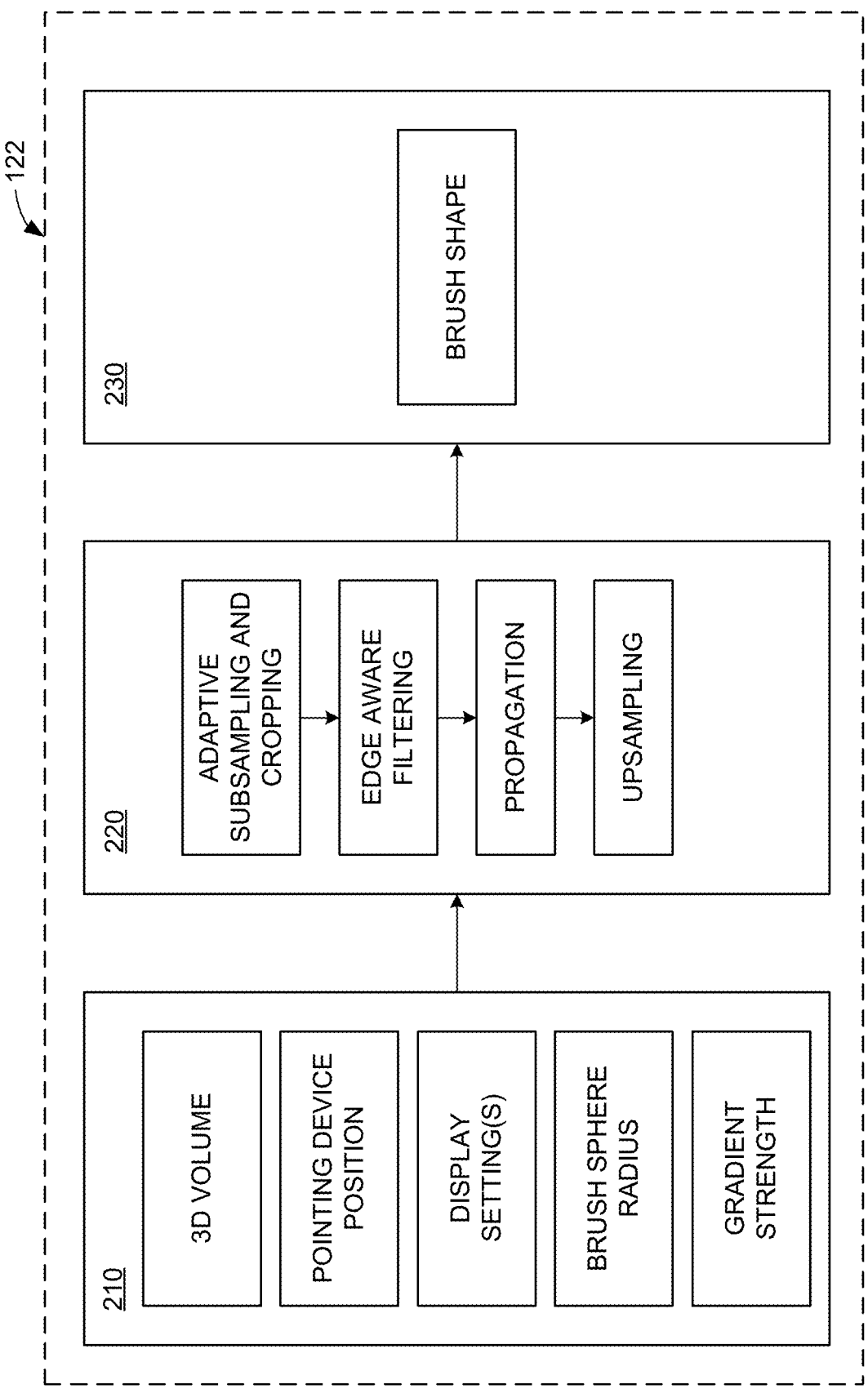
FIG. 2 illustrates an example implementation of the edge aware brush of the system of FIG. 1.

FIG. 2 illustrates an example implementation of the edge aware brush 122 of the system 100. A brush is a graphical element or tool that represents software instructions instantiated in a visible graphical element to be manipulated by a user. Movement and/or other interaction with the brush is translated by a processor into instructions to be executed by the processor to modify content displayed via the user interface 121 and underlying data associated with the displayed content (e.g., to segment an image, annotate an image, etc.).

Standard brushes for medical images do not look at the underlying images to draw a paint stroke. Since the brush construct is not tracking or processing image data on the screen, but rather is simply movable around the display independent of the underlying image data, it is difficult to be accurate near the boundaries of a structure of interest. For example, two different users would have very different results because each user moves the brush differently via the interface, and the bush and associated interface fail to guide the user.

In contrast, certain examples provide a technologically improved, image data and associated edge/contour aware brush 122 that understands the displayed image data and its shape and is reluctant to cross edges/contours/boundaries in the underlying image data. This edge-aware brush 122 dynamically adapts its shape on the user interface 121 to fit the underlying image and provides consistent boundaries across multiple users performing the same task.

As shown in FIG. 2, a data structure 122 driving the "smart" brush user interface manipulation construct includes an input configurator 210, a brush shape generator 220, and a graphical user interface element controller 230. Input to the input configurator 210 includes a 3D image volume, a position of a pointing device on the user interface 121 (e.g., corresponding to desired/current brush position), display setting(s) (e.g., window width, window level, etc.) of an associated user interface 121 viewport, brush shape control parameters (e.g., brush radius, gradient strength, etc.), etc. Thus, the configurator 210 utilizes the position of the pointing device where the brush is to be computed, the image content to be analyzed, viewport display settings to provide better consistency between brush deformation and the image displayed via the interface 121, etc. Brush shape control parameters include a brush radius to control the size of the brush and gradient strength to control the edge aware capabilities of the brush, for example.

The brush shape generator 220 uses these inputs for adaptive subsampling and cropping 222, edge aware filtering 224, propagation 226, upsampling 228, etc., to generate a brush shape for generation and control via the graphical user interface element controller 230. For example, the generator 220 can process the pointing device position and brush radius to compute a largest bounding box that includes the entire brush construct. Then, the 3D volume is re-sampled and cropped 222 using this bounding box. By adaptively subsampling the image data and cropping 222 the 3D volume image to focus on a small part of the input image data, brush shape calculation speed is increased. Subsampling can artificially reduce a number of voxels to be processed, for example, thereby increasing processing speed, even on a slower computer. Further, windowing and/or other viewport display setting(s) can be used to normalize future gradient computation and produce an isotropic pixel (e.g., which has a same pixel resolution along the x, y and z axis) to improve accuracy during propagation, for example. In certain examples, a subsampling factor is automatically computed using the hardware capabilities of a processor and/or other computing device on which the system 100 is implemented. This subsampling allows even a slow computer to provide real-time processing and visualization of the brush construct with respect to the displayed image data.

An example computer screen uses 8 bits to display a grey pixel. With 8 bits, 256 greyscales can be displayed. This is far lower than the precision of a medical image (e.g., 12 bits or 16 bits per pixel producing 4096 and 65536 greyscales, respectively). With windowing, certain examples allow a user and/or the computing device to define a range minimum and maximum for greyscales that are to be displayed on the screen. The brush internally uses the same range (e.g., same windowing). By using the same windowing range, a strength of the gradient considered by the generator 220 is the same as the gradient visualized by the user via the user interface 121. This eases the understanding of the brush shape. Changing the windowing can also help the user to segment a specific part of the 3D image volume, for example.

Additionally, the image data can include noise (e.g., Gaussian noise for 3D medical images, etc.) that can cause rough boundaries in the brush. The noise can be reduced using edge aware filtering 224. The noise can cause the brush shape to become irregular and not smooth. By applying a 3D low pass filter on a temporary image, the brush shape may not be perturbed by the noise, and its shape is regular. For the low pass filter, a filter is preferably chosen that does not blur image boundaries (e.g., a bilateral filter, an anisotropic diffusion filter, a total variation denoising filter, etc.), for example.

The brush shape and location are computed by the generator 220 using a propagation 226 on the filtered image based on a morphological Amoebas distance with respect to a position of the pointing device, for example. For example, a path distance L is defined which considers the gradient accumulation along this path (e.g., lambda is a parameter given by the user to modulate the gradient strength and $d_{pixel}$ is the greyscale difference between 2 adjacent pixels Image $(x_i)$ and Image$(x_{i+1})$). Then, the Amoebas distance d(x,y) is a shortest path between pixel x and y. The brush shape is the set of all pixels having an Amoebas distance smaller than the brush radius (e.g., a parameter set by the user, computing device, etc.). For example, a path distance, L($\sigma$), can be determined as follows:

$$L(\sigma) = \sum_{i=0}^{n} [1 + \lambda \cdot d_{pixel}(\text{Image}(x_i), \text{Image}(x_{i+1}))] \quad \text{(Equation 1)}$$

$$\begin{cases} d_\lambda(x, x) = 0 \\ d_\lambda(x, y) = \min_\sigma L(\sigma), \text{ minimum taken on all} \\ \text{paths between } x \text{ and } y \end{cases}$$

In certain examples, the Amoebas distance can be slightly modified to form a spherical shape for the brush when there is no gradient. In certain examples, the edge aware capability can be removed by setting the gradient strength parameter to 0 (lambda $\lambda$ in Equation (1) above). In this special case, this brush behaves as a brush without edge aware intelligence.

Thus, the image gradient can be taken into account with respect to brush representation 122 location through an Amoebas distance, which adds a factor related to brush gradient when traversing from one pixel to the next. Thus, exact positioning of the brush representation 122 accounts for gradient and boundary/contour in the image, and lambda in equation (1) provides a trade-off between strength of gradient and brush shape to drive display of the brush 122 on the interface 121 with respect to the image.

In certain examples, the brush shape is computed by the generator 220 on a low resolution isotropic 3D image. The brush shape is then transferred to the initial image resolution using nearest neighbor interpolation by upsampling 228, for example. As an output, the brush shape interface construct 122 can be encoded by the graphical user interface element controller 230 using an RLE mechanism to compress the information and speed up the process.

Figure 3:
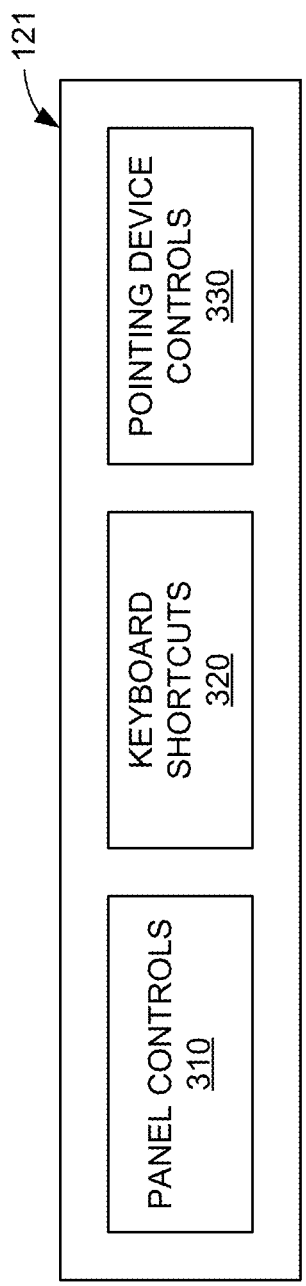
FIG. 3 provides further detail regarding an example implementation of the user interface of FIG. 1.

FIG. 3 provides further detail regarding an example implementation of the user interface 121. The user interface 121 facilitates control of the edge aware brush generation, tracking, and manipulation process. Brush parameters can be manually tuned using different interface(s). In certain examples, triggering/activation controls are redundant and can be leverage using different mechanisms such as panel controls 310, keyboard shortcuts 320, pointing device controls 330, etc.

Figure 4:
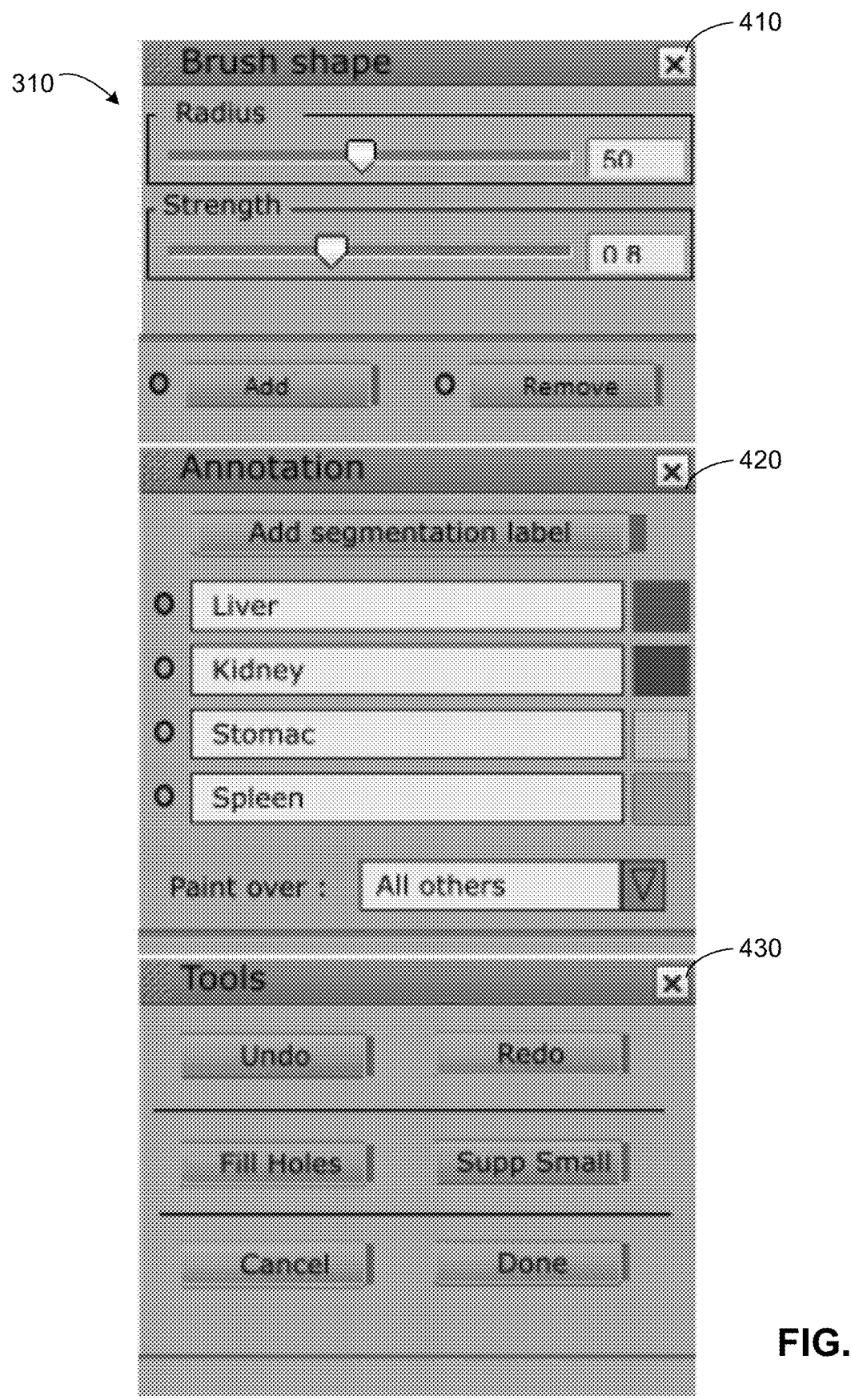
FIG. 4 depicts an example of a panel of brush controls.

An example of a panel of brush controls 310 is depicted in FIG. 4. A first portion of the panel 310 includes brush shape controls 410 to affect the brush's behavior. For example, sliders are used to change brush radius, brush strength/sensitivity to the image gradient (lambda parameter in the equation 1), etc. Parameters can be changed depending on the size, contour, homogeneity, etc., of the structure to be segmented. Further, brush state (e.g., draw, erase, etc.) can be toggled via the panel 310. A second portion of the panel 310 provides segmentation labeling/annotation controls 420. For example, a color and a label can be defined for each organ/structure to be segmented with the brush. A third portion of the panel 310 provides controls 430 such as undo, redo, valid, fill holes, supplement/remove small, cancel, done, etc. For example, the undo button is used to remove the last strokes painted, and the redo button repeats painted strokes in a different location. The valid/validate/done button finalizes the segmentation state and closes the tool. Remove small and fill holes can be used in an advanced mode, for example. The remove small is used to remove from the segmentation isolated voxels (or group of voxels). The fill hole button changes the segmentation by adding group of voxels that are completely surrounded by a voxel that is part of the segmentation, for example.

Keyboard shortcuts 320 can be provided to duplicate controls of the panel 310, providing added speed through user manipulation of the keyboard shortcuts 320 rather than selection of panel 310 sliders, buttons, etc. For example, a control key can be used to toggle a brush mode (e.g., draw, erase, etc.). A plus and/or minus (+/−) key can be used to change a size of the brush, for example. A number key (e.g., 0, 1, 2, 3 . . . , 9, etc.) can be used to change a current segmentation label, for example. Key combinations, such as Ctrl+Z, Ctrl+Y, can trigger actions such as undo/redo process, etc. An enter key can trigger finalization of the segmentation process, for example.

Alternatively or in addition, to simply user interactions, some or all controls can be changed using the pointing device 330. For example, a combination of a control key and/or other key and mouse movement can trigger an action. For example, ctrl+a horizontal movement of the pointing device can reduce/enlarge the brush size. For example, ctrl+a vertical movement of the pointing device can reduce/increase the gradient strength parameter.

By providing redundant controls 310-330, ease of use of the brush can be improved and speed of the segmentation process can be increased. In some examples, some parameters can be hidden from a standard user/standard mode and made available only to an advanced user/advanced mode. In such examples, default parameters can be provided/preconfigured to accommodate segmentation for most "standard" or normal medical images cases. For example, the lambda parameter can be a constant that has been pre-tuned for a given task.

Figure 5:
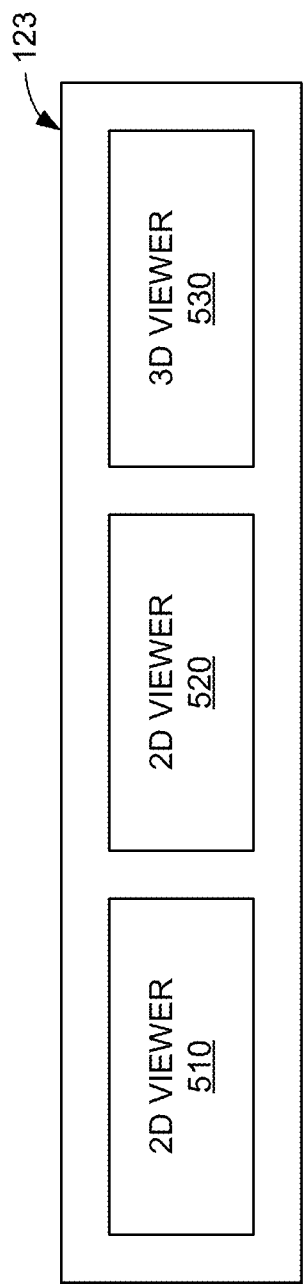
FIG. 5 shows example areas of the user interface of the example of FIG. 1.

The example output generator 130 provides real-time (or substantially real-time given a data transmission, retrieval, processing, and/or display delay/latency, etc.) 3D rendering via the user interface 121. To get an accurate segmentation, the user must see what he/she is doing in real time. Thus, the brush shape is computed in real time and displayed to the user on the active viewport (used by the pointing device) (and other secondary viewport) of the user interface 121, for example. FIG. 5 shows example areas 510, 520, 530 of the user interface display 121. For example, the interface 121 can include a first 2D viewer 510, a second 2D viewer 520, and a 3D viewer 530. The first 2D viewer 510 displays segmentation map(s) representing axial, sagittal, and/or coronal slices of a 3D volume. The segmentation map(s) can be displayed via the viewer 510 as color overlay(s) of a 3D greyscale image, for example. A 3D brush shape is computed and displayed in real time for pointing device movement with respect to the 2D viewer 510. Thus, before drawing a stroke on the image, the user can control the future outcome of the brush. This provides a predictable tool which is an important feature for usability, for example.

In addition to classical axial, sagittal and coronal planes (corresponding to the image axis), further axis(es) can be defined in the second 2D viewer 520 in any orientation into the 3D volume (e.g., an oblique orientation, etc.). The second 2D viewer 520 provides another plane which may be easier to segment. Thus, if a traditional axial/sagittal/coronal view 510 fails to provide a sufficient view for segmentation, the second 2D viewer 520 can define another planar view that provides easier segmentation of a region of interest in the image data. The adaptive, edge-aware brush can be used to interact with image representation(s) in the second 2D viewer 520 as well.

Using a pointing device to control the brush in the 2D viewer 510 and/or the 2D viewer 520 allows a structure/region of interest to be segmented. In certain examples, segmentation can begin in the 2D viewer 510 on a first slice (e.g., an axial slice, sagittal slice, coronal slice, etc.), and continue on one or more second slices (e.g., an axial slice, sagittal slice, coronal slice, etc.) in the viewer 510, and then finish using oblique slice(s) via the 2D viewer 520. In an example, the user manipulates the brush via the pointing device to begin segmentation on an axial slice of the 2D viewer 510, continue with a sagittal slice via the 2D viewer 510, and complete the segmentation with respect to an oblique slice via the 2D viewer 520.

However, the 2D viewers 510, 520 have some limitations. For example, the viewers 510, 520 involve scrolling down and up into the 3D image volume to see the entire segmentation. Thus, the 3D viewer 530 is defined with volume rendering of the segmentation. The 3D viewer provides a 3D representation of the brush in real time and enables the user to control the brush shape accurately with respect to the 3D volume rendering. The brush shape computation and the visualization associated with the graphical brush interface construct are executed in real time or substantially in real time as noted above (e.g., a minimal frame rate of 15 frames per second can guarantee a good user experience, etc.). The rapid computation and visualization help ensure the accuracy and repeatability required for the ground truth generation for a deep learning algorithm, for example.

Figure 6:
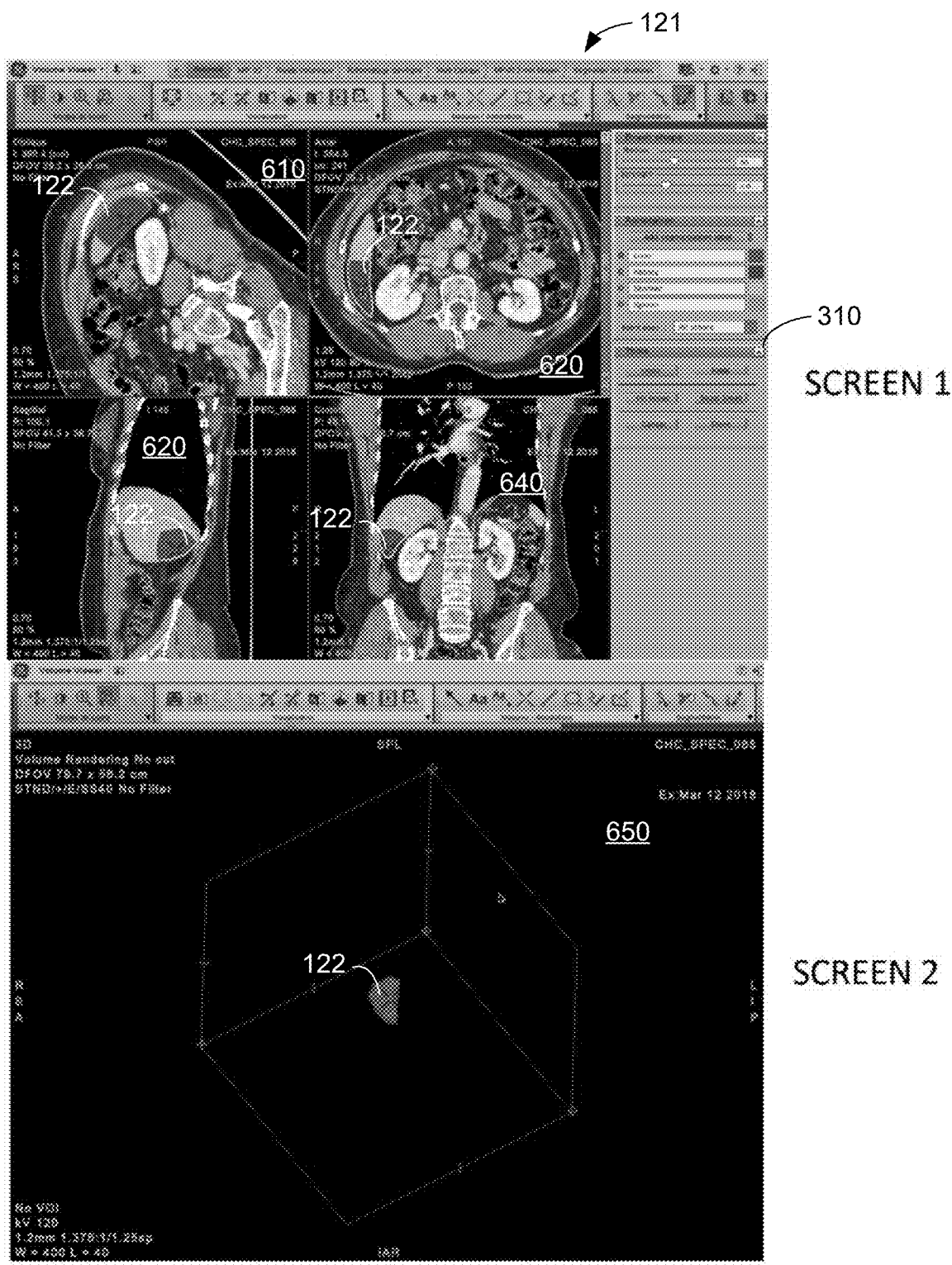
FIG. 6 illustrates and example user interface display in accordance with the system of FIG. 1

FIG. 6 depicts an example of the user interface 121 including the panel 310 and a plurality of viewports 610-640 on a first screen and a volume rendering 650 on a second screen. An example brush 122 is shown in each of the plurality of viewports (e.g., oblique 610, sagittal 620, axial 630, coronal 640) so that the user sees a preview of segmentation size as well as confirmation of the scope/extend of the segmentation, correlated with brush 650 size, through multiple views. Thus, a volume viewer interface 121 can provide the plurality of views 610-650 of FIG. 6 to facilitate 3D manipulation and viewing of the segmentation brush 122 with respect to structures in the 3D volume for accurate segmentation planning and execution.

Figure 7:
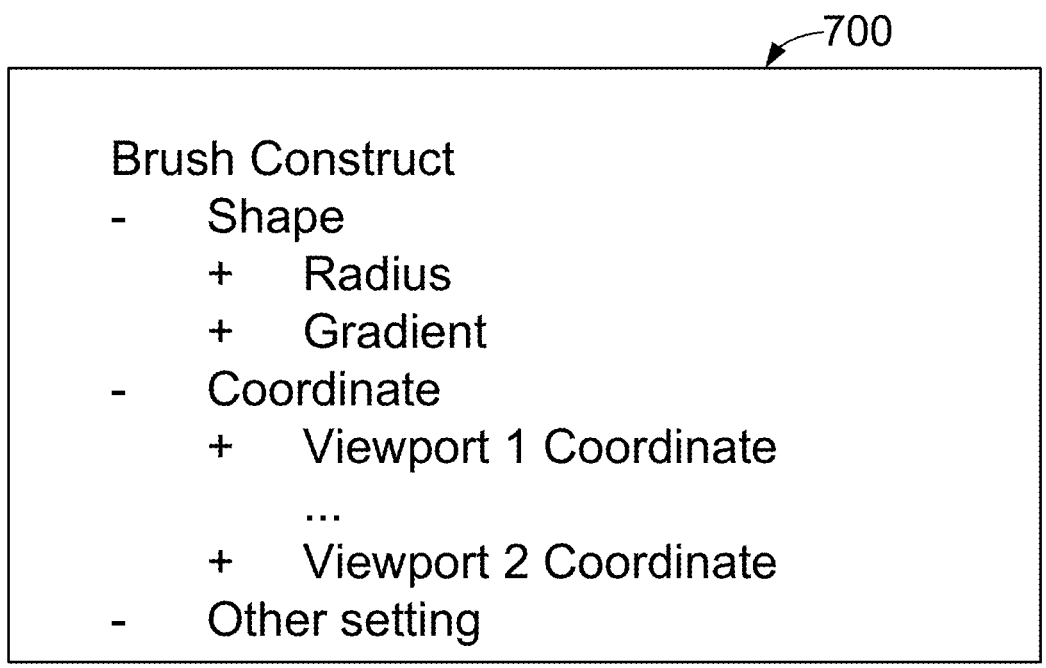
FIG. 7 depicts an example data structure to instantiate an edge-aware brush interface construct.

FIG. 7 illustrates an example data structure 700 representing a brush construct 122 for use with the user interface 121 and associated image data and segmentation processing. The example data structure 700 can be represented by instructions and data and executed using a processor to generate the system 100 including the brush 122 and its interaction with the user interface 121 to provide segmentation 131-132 of image data. The example data structure 700 defines a brush shape including variables for brush radius and gradient strength. The brush radius impacts how large the brush representation 122 can become on the interface 121 when not constrained by object boundary(-es) in the image data. The gradient strength impacts the brush radius and flexibility/adaptability in brush shape. For example, if no gradient is applied, then the brush 122 appears as a sphere on the interface 121. Otherwise, the gradient constrains the displayed shape of the brush 122 on the interface 121. The example data structure 700 also defines one or more sets of coordinates that can be used to define and track brush 122 position with respect to the user interface 121. The coordinates can provide brush 122 position in viewports 1-N 610-650 representing brush 122 placement with respect to one or more image planes. By tracking brush 122 position, the system 100 can determine an area of the image to segment 131-132 (e.g., brush 122 coordinates can be mapped to image display coordinates, etc.).

Thus, certain examples provide real-time visualization of a dynamic, edge-aware brush via a primary viewport as well as on secondary viewports (e.g., 2D, 3D, virtual reality (VR), maximum intensity projection (MIP), curved etc.). By providing visualization of the brush across multiple viewports, greater control of the brush shape can be provided in 3D. The brush's ability to deform itself in 3D using the information of the 3D image also represents a technological improvement over prior segmentation brush capability, for example.

Certain examples enable development of advanced applications in which a user can accurately segment and/or correct a failed automatic segmentation of structure(s) of interest in an image volume with few interactions of the pointing device. The brush deformation procedure is repeatable and predictable. Further, by encoding the brush interface construct with a reluctance/resistance to crossing a high image boundary, segmentation along image element boundaries can be improved in accuracy, speed, clinical reliability, etc., compared to existing tools. The "smart" brush provides improved reproducibility between annotators by decreasing human variabilities in pointing device manipulation and segmentation boundary placement, for example. Additionally, real-time rendering helps enforce predictability and repeatability. Real-time feedback via one or more secondary views provides some additional control and avoids having segmentation leak into unwanted structures not visible in a primary view.

A user is provided with improved control, customization, and manipulability of the brush and its shape in 2D and 3D during segmentation. Thus, a user can concentrate less and be less precise and still achieve high quality, repeatable, accurate segmentation results. Further, the "smart" brush is reactive and fast, adapting to fill an available space based on detected boundaries/contours in the associated structure of the image (across planes in 3D). Before clicking and/or otherwise selecting to finalize a segmentation, a preview is provided showing the brush shape corresponding to the segmentation in real time. Thus, the user knows in advance what would be the segmentation of the image. Certain examples provide faster creation and correction of segmentation and provide a framework for imaging applications involving image segmentation.

While example implementations are illustrated in conjunction with FIGS. 1-7, elements, processes and/or devices illustrated in conjunction with FIGS. 1-7 can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc. storing the software and/or firmware.

Figure 8:
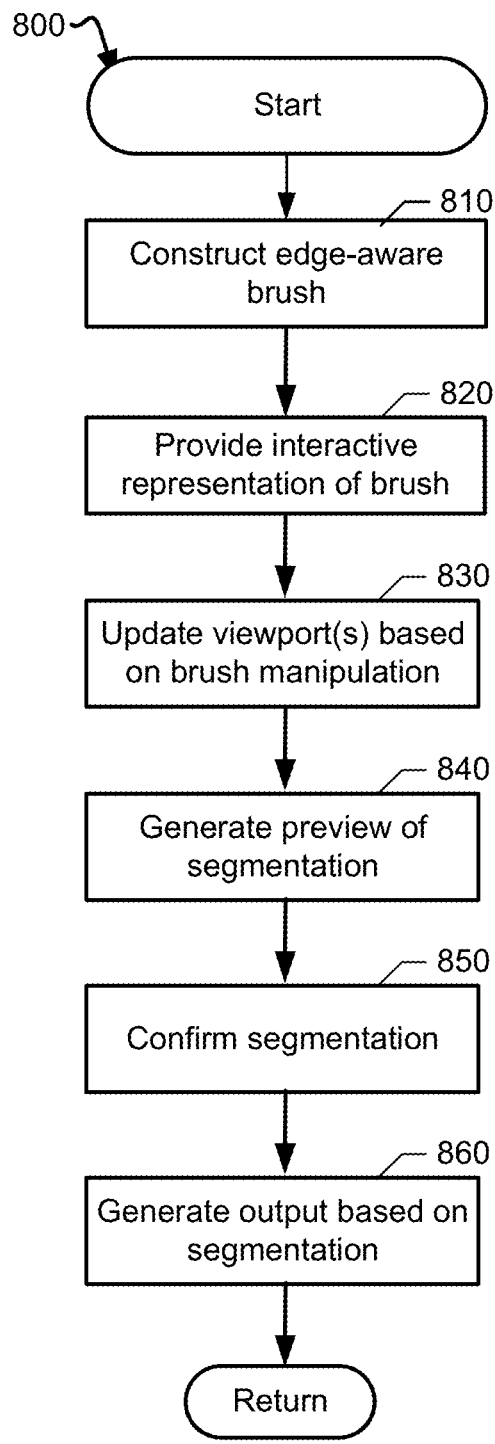
FIG. 8 illustrates a flow diagram of an example method of instantiating an edge-aware brush for image segmentation in accordance with the systems and/or apparatus of FIGS. 1-7.

A flowchart representative of example machine readable instructions for implementing components disclosed and described herein are shown in conjunction with at least FIG. 8. In the examples, the machine readable instructions include a program for execution by a processor such as the processor 912 shown in the example processor platform 900 discussed below in connection with FIG. 9. The program may be embodied in machine readable instructions stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in conjunction with at least FIG. 8, many other methods of implementing the components disclosed and described herein may alternatively be used. For example, the order of execution of the blocks may be changed, and/or some of the blocks described may be changed, eliminated, or combined. Although the flowchart of at least FIG. 8 depicts example operations in an illustrated order, these operations are not exhaustive and are not limited to the illustrated order. In addition, various changes and modifications may be made by one skilled in the art within the spirit and scope of the disclosure. For example, blocks illustrated in the flowchart may be performed in an alternative order or may be performed in parallel.

As mentioned above, the example process(es) of at least FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of at least FIG. 8 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

As shown in the example method 800 depicted in FIG. 8, image navigation and segmentation can be facilitated using an adaptive, edge-aware brush. At block 810, the edge-aware brush is constructed. For example, the system 100 driving the user interface 121 defines the brush 122 based on a defined radius, gradient, etc. The radius determines a size of the brush 122 on display, and the gradient determines how responsive/sensitive/reluctant the brush 122 is to cross detected boundaries among objects/regions in the image data. For example, a brush 122 with no gradient remains a sphere when maneuvered on the interface 121, but a brush 122 with a certain amount of gradient has its shape shift to adapt to boundaries, contours, etc., in the underlying image data (e.g., based on changes in intensity value, reference image comparison, annotations, etc.).

At block 820, an interactive graphical representation of the edge-aware brush 122 is provided (e.g., displayed, etc.) to be used in conjunction with a user interface 121 for image segmentation. The brush shape 122 can be represented in 2D and/or in 3D depending on user preference, displayed view(s), etc. Thus, a user can manipulate the brush 122 and change its position on the interface 121 using a pointing device, keyboard, touch screen, etc. One or more controls 310-330 can be provided in association with the brush 122 for manipulation of the brush and navigation of displayed image content on the interface 121.

At block 830, viewports 610-650 of the user interface 121 are updated based on manipulation of the graphical representation of the edge aware brush 122. The brush 122 can be constrained to remain within detected boundaries in the image according to its radius and gradient, for example. A position of the brush 122 is computed with respect to the image views 610-650 displayed via the screen(s) of the interface 121, for example.

At block 840, a preview of segmentation is generated based on position of the brush 122 in the plurality of viewports 610-650. The segmentation preview can be determined and displayed via the interface 121 based on adaptive subsampling and cropping 222 of the image data, edge aware filtering 224 of the brush 122, propagation 226 to determine brush shape 122 and location with respect to pointing device position, and upsampling 228 to improve resolution of the brush shape 122 (and associated segmentation) by transferring an initial low-resolution brush shape to a higher-resolution representation 122, for example. If a predefined segmentation 112-113 is present, the edge-aware brush 122 can be guided and/or otherwise constrained by that segmentation 112-113. Otherwise, the brush 122 can dynamically determine the segmentation.

At block 850, the segmentation can be confirmed. Thus, if the segmentation is acceptable, the segmentation can be confirmed (e.g., by a mouse click, button selection, gesture, etc.). In certain examples, the segmentation is color-coded (or patterned, textured, etc.) on the interface 121 so that the segmentation stands out from the underlying image content. In some such examples, if multiple segmentations are defined, each segmentation can be represented in a different color, pattern, texture, etc.

At block 860, an output is generated based on segmentation of the image. For example, an image that has been segmented into one or more regions/objects can be used as a training and/or testing input for a deep learning network. The segmented image can also be provided for computer-aided diagnosis, radiology reading, etc.

Figure 9:
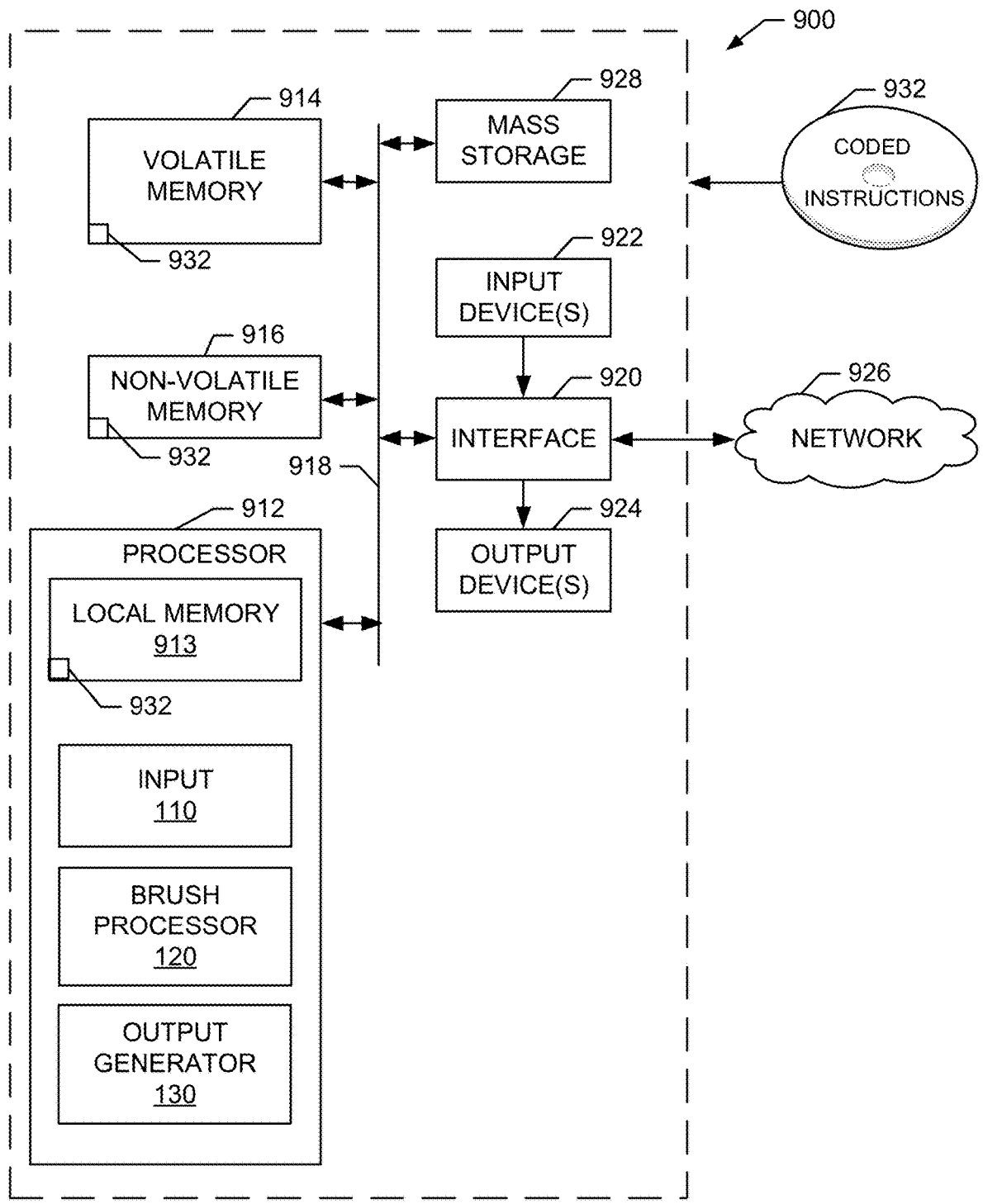
FIG. 9 is a block diagram of a processor platform structured to execute the example machine readable instructions to implement components disclosed and described herein.

FIG. 9 is a block diagram of an example processor platform 900 structured to executing the instructions of at least FIG. 8 to implement the example components disclosed and described herein. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by integrated circuits, logic circuits, microprocessors or controllers from any desired family or manufacturer.

The processor 912 of the illustrated example includes a local memory 913 (e.g., a cache). The example processor 912 of FIG. 9 executes the instructions of at least FIG. 8 to implement the systems, infrastructure, displays, and associated methods of FIGS. 1-8 such as the example input processor 110, brush processor 120 (and its interface 121 and brush 122), output generator 130, etc. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a clock controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a sensor, a microphone, a camera (still or video, RGB or depth, etc.), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 9 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus, and articles of manufacture have been disclosed to generate a new, adaptive, edge aware brush to segment image data into one or more regions. Certain examples improve radiology review interface technology and capabilities by provide a brush that is adjustable and responsive, based on shape and gradient, to boundaries/contours in an image to assist a user in accurate, precise segmentation across images and users. Certain examples improve an image processor to be more adaptive and accurate in image processing and user interface generation, manipulation, and tracking. Certain examples drive improvements in other technology areas such as computer-aided detection and/or diagnosis of image data, deep learning network model generation, etc.

Certain examples enable a user to move a mouse or other pointing device with respect to an image displayed on a user interface, and the brush takes a shape that is allowed for that area of the image (e.g., constrained by one or more boundaries/contours for that image area according to the sensitivity/resistance specified by a gradient, etc.). Using the brush, a user can "paint" the image(s) in 2D and/or in 3D to define a segmentation area of the image. A preview of the segmentation is provided on the interface according to a certain color, pattern, texture, highlight, etc., and the preview can be confirmed to generate the segmentation in the image (e.g., annotate the image data file accordingly, etc.). Based on contour/boundary defined and/or detected in the image data, as well as brush radius and gradient sensitivity, a user can manipulate the brush to paint an image in one or more planes (e.g., in one or more viewports separately (e.g., painting is done in each viewport and then combined) or in synchrony (e.g., painting in one viewport appears on the corresponding image area in another viewport) without crossing boundaries on any plane, for example. Thus, the brush adapts its shape in real time to assist the user and prevent crossing of image boundaries. A plurality of views (e.g., axial, coronal, sagittal, oblique, 3D volume rendering, etc.) can be impacted. The brush can be used to segment and annotate image data for training of deep learning and/or other artificial intelligence network model, for example.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. At least one non-transitory computer readable storage medium including instructions which, when executed, cause at least one processor to at least:
   construct a brush for segmentation of image data;
   provide an interactive representation of the brush with respect to the image data via a user interface, the interactive representation to be displayed and made available for interaction in each of a plurality of viewports provided for display of views of the image data in the user interface;
   enable update of the viewports based on manipulation of the representation;
   facilitate display of a preview of a segmentation of the image data corresponding to a location of the representation; and
   when the segmentation is confirmed, facilitate generation of an output based on the segmentation.

2. The at least one non-transitory computer readable storage medium of claim 1, wherein the brush is to be constructed according to a radius and a gradient, wherein the radius defines a default size of the representation and the gradient defines a sensitivity to at least one of boundaries or contours in the image data, the representation to adapt to the at least one of boundaries or contours in the image data according to a value of the gradient defined for the brush.

3. The at least one non-transitory computer readable storage medium of claim 2, wherein the at least one of boundaries or contours in the image data are associated with a predefined segmentation.

4. The at least one non-transitory computer readable storage medium of claim 1, wherein the representation of the brush is to be displayed in at least one of two dimensions or three dimensions.

5. The at least one non-transitory computer readable storage medium of claim 1, wherein the location of the representation is to be determined using a three-dimensional propagation from a pointing device used to manipulate the representation with an Amoebas distance.

6. The at least one non-transitory computer readable storage medium of claim 1, wherein the preview of the segmentation is to be generated by adaptive subsampling and cropping of the image data, edge aware filtering of the representation of the brush, propagation to determine a shape and location of the representation with respect to a pointing device used to manipulate the representation, and upsampling of the representation.

7. The at least one non-transitory computer readable storage medium of claim 1, wherein the plurality of viewports includes a plurality of two-dimensional viewers and a three-dimensional viewer.

8. An apparatus comprising:
   at least one processor; and
   at least one computer readable storage medium including instructions which, when executed, cause the at least one processor to at least:
   construct a brush for segmentation of image data;
   provide an interactive representation of the brush with respect to the image data via a user interface, the interactive representation to be displayed and made available for interaction in each of a plurality of viewports provided for display of views of the image data in the user interface;
   enable update of the viewports based on manipulation of the representation;
   facilitate display of a preview of a segmentation of the image data corresponding to a location of the representation; and
   when the segmentation is confirmed, facilitate generation of an output based on the segmentation.

9. The apparatus of claim 8, wherein the brush is to be constructed according to a radius and a gradient, wherein the radius defines a default size of the representation and the gradient defines a sensitivity to at least one of boundaries or contours in the image data, the representation to adapt to the at least one of boundaries or contours in the image data according to a value of the gradient defined for the brush.

10. The apparatus of claim 9, wherein the at least one of boundaries or contours in the image data are associated with a predefined segmentation.

11. The apparatus of claim 8, wherein the representation of the brush is to be displayed in at least one of two dimensions or three dimensions.

12. The apparatus of claim 8, wherein the location of the representation is to be determined using a three-dimensional propagation from a pointing device used to manipulate the representation with an Amoebas distance.

13. The apparatus of claim 8, wherein the preview of the segmentation is to be generated by adaptive subsampling and cropping of the image data, edge aware filtering of the representation of the brush, propagation to determine a shape and location of the representation with respect to a pointing device used to manipulate the representation, and upsampling of the representation.

14. The apparatus of claim 8, wherein the plurality of viewports includes a plurality of two-dimensional viewers and a three-dimensional viewer.

15. At least one non-transitory computer readable storage medium including processor-executable instructions and a data structure, the data structure including:
   a brush construct, the brush construct specifying an interactive representation to be displayed with respect to image data via a user interface, the interactive representation to be displayed and made available for interaction in each of a plurality of viewports provided for display of views of the image data in the user interface for segmentation of the image data, the brush construct defined by:
   a shape including a radius and a gradient, wherein a value of the radius defines a default size of the representation and a value of the gradient defines a sensitivity to at least one of boundaries or contours in the image data, the representation to adapt to the at least one of boundaries or contours in the image data according to the value of the gradient defined for the brush; and
   coordinates including first coordinates to store a position of the representation with respect to a first viewport of the user interface and second coordinates to store the position of the representation with respect to a second viewport of the user interface.

16. The at least one non-transitory computer readable storage medium of claim 15, wherein the at least one of boundaries or contours in the image data are associated with a predefined segmentation.

17. The at least one non-transitory computer readable storage medium of claim 15, wherein the representation of the brush is to be displayed in at least one of two dimensions or three dimensions.

18. The at least one non-transitory computer readable storage medium of claim 15, wherein the coordinates are to be determined using a three-dimensional propagation from a pointing device used to manipulate the representation with an Amoebas distance.

19. The at least one non-transitory computer readable storage medium of claim 15, wherein the first viewport includes a two-dimensional viewer and the second viewport includes a three-dimensional viewer.

20. The at least one non-transitory computer readable storage medium of claim 15, wherein the data structure is to enable generation of a preview of segmentation of the image data with respect to the representation by adaptive subsampling and cropping of the image data, edge aware filtering of the representation according to the data structure, propagation to determine a shape and location of the representation with respect to a pointing device used to manipulate the representation, and upsampling of the representation according to the data structure.

\* \* \* \* \*